No. 646,165. Patented Mar. 27, 1900.
G. H. CROSBY.
WHEEL.
(Application filed Apr. 12, 1899.)
(No Model.)
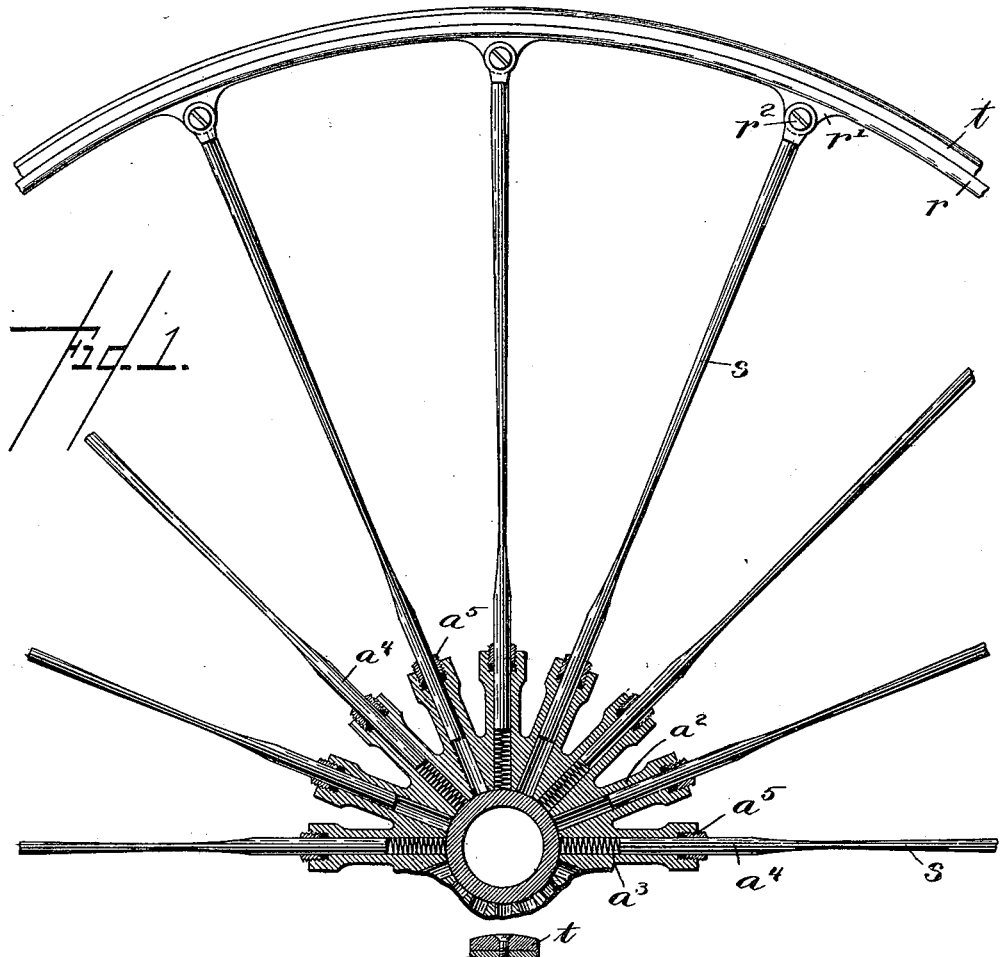
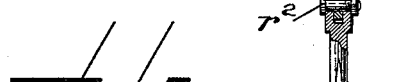
WITNESSES.
Charles F. Logan.
Thomas J. Drummond
INVENTOR.
GEORGE H. CROSBY.
BY Crosby Gregory
ATTYS.
THE NORRIS PETERS CO., PHOTO-LITHO., WASHINGTON, D. C.

UNITED STATES PATENT OFFICE.

GEORGE H. CROSBY, OF ALBION, MAINE.

WHEEL.

SPECIFICATION forming part of Letters Patent No. 646,165, dated March 27, 1900.

Application filed April 12, 1899. Serial No. 712,791. (No model.)

*To all whom it may concern:*

Be it known that I, GEORGE H. CROSBY, of Albion, county of Kennebec, State of Maine, have invented an Improvement in Wheels, of which the following description, in connection with the accompanying drawings, is a specification, like letters on the drawings representing like parts.

My invention is an improved vehicle-wheel having for its object the provision of means for automatically preventing the jolting and jarring due to an uneven road-bed, my invention also affording convenient means for relieving the shock of the load from the running-gear.

I provide the nave or hub of the wheel with a plurality of radiating cylinders corresponding in number to the spokes of the wheel, and I provide the latter at their inner ends with cylindrical portions which fit within said cylinders as pistons, suitable coöperating parts being arranged whereby each spoke maintains an air-cushion in the nave at the inner end of the spoke. I also provide the spokes outside their cylindrical inner ends with thin flat parts resilient laterally within the plane of the wheel, whereby each spoke also contributes a resilient lateral strain coöperating with the air-cushions in sustaining the hub and relieving it from all shocks, jolts, and jars, and preferably in addition thereto I provide other resilient means—as, for example, springs—which assist the air and flattened spokes in upholding the load and overcoming the jarring and jerking due to the movement of the vehicle.

Other features of construction and operation will be made apparent in the course of the following detailed description, reference being had to the accompanying drawings, illustrative of the preferred embodiment of my invention, and the latter will be more specifically defined in the appended claims, also forming a part of this specification.

In the drawings, Figure 1 is a broken side elevation of a sufficient portion of a wheel to illustrate my invention, the nave or hub thereof being shown in vertical section. Fig. 2 is a vertical axial section of a portion of the wheel shown in Fig. 1.

The hub $a$ contains a central sleeve or tubular portion having usual flanges $a'$ to support the wheel properly on any usual axle. Extending radially from the middle portion of the hub are a plurality of arms $a^2$, each bored out longitudinally at $a^3$ to constitute a cylinder in which the cylindrical head $a^4$ of the alined spoke $s$ is fitted to reciprocate after the fashion of a piston, the outer end of the cylinder being preferably provided with a packing-gland $a^5$ of any usual construction, so that the cylinder may be rendered substantially air-tight in order to retain the air within as an air-cushion coöperating with the piston-spoke. In addition to this arrangement the spokes are also flattened a portion of their length between their cylindrical heads and their outer ends, as indicated at $s'$, the flat surface extending at right angles to the plane of the wheel. Each spoke is connected, preferably in a hinged manner, to the rim of the wheel, the latter being herein indicated at $r$ and provided with any suitable tire $t$.

The rim of the wheel is herein shown as provided at regular intervals with depending flanges or ears $r'$, to which the outer ends of the spokes are secured by means of bolts $r^2$. Preferably below each alternate spoke I provide a helical spring $a^6$ in order to supplement the resilient action of the compressed air on the inner end of the spoke, although it will be understood that for light vehicles and in certain conditions of use these springs need not be employed, and in some cases it will be desirable to employ a greater or less number of the springs. Thus in operation when the wheel moves over the ground and pressure is brought to bear thereon the nave or hub will move below the center until counterbalanced by the various resilient forces within the wheel, this movement, however, being only slight on account of the rapid changing of position of the plunger-like or piston-ended flattened spokes relatively to the multicylinder hub. The result is that an easy smooth motion is given and all the disagreeable effects resulting from rolling over rough roadways are obviated.

As the successive spokes come into position in the lower part of the moving wheel they slide in their cylinders, compressing the air at their inner ends and also the helical spring, provided the latter be used, and as they reach the rear lower quadrant of the revolving wheel the compressed air and spring simultaneously exert a repelling force. The opposite spokes on the upper part of the wheel also slide in their cylinders, but outwardly, expanding the air at their inner ends, which in a similar manner exerts an attracting force, these forces coöperating with the lateral strain exerted by the flat resilient portion of the spoke to restore the spoke to its normal position, and this cycle of movements is repeated for the successive spokes in the progress of the wheel. Also the yielding end of the spoke, together with the hinged joint thereof at the rim, accommodates the spokes to their changing positions and takes up all lateral strains.

As the spokes are flattened transversely to the plane of the wheel, they prevent any sidewise movement of the rim out of its proper plane, while yet permitting the desired yielding movement of the spokes in the direction of the plane of the wheel.

I wish it understood that I am not restricted in all respects to the details of my invention as herein shown and described, but that very many changes in construction may be resorted to without departing from the spirit and scope of my invention.

It will be noticed that the weight of the load will be sustained through the rim and spokes in a yielding manner, as upon the compressed air in the air-tight bores of the hub and also by the springs used in different quantities, and it will also be understood that there is another strain to which the wheel is subjected—that is, should the wheel be running on the road and meet an obstruction which would strike the wheel at a point below that part of the wheel sustaining the load the blow exerted would be at an angle to the vertical line of pressure of the wheel on the roadway, and this angular blow would have a tendency to temporarily restrain the movement of the rim at what would otherwise be its full velocity, and the yielding connection of the outer end of the spoke with the rim at this time comes into play and enables the rim and outer end of the spoke to give a little, one with relation to the other, in a manner which could not be done if the end of the spoke entered a hole in the rim or were rigidly connected with the rim.

Having fully described my invention, what I claim, and desire to secure by Letters Patent, is—

1. A vehicle-wheel comprising a hub provided with a series of fixed radial projections and packing compressing devices, a rim, and a series of connected spokes, the inner ends of which are extended through said packing compressing devices and enter and slide in the bores of the hub with an air-tight piston fit.

2. A vehicle-wheel, comprising a hub provided with a series of fixed radial projections and packing compressing devices, a rim, and a series of connected spokes, the inner ends of which are extended through said packing compressing devices and enter and slide in the bores of the hub with an air-tight piston fit, and springs arranged in a suitable number of said bores, one end of each of said springs abutting the inner end of a spoke.

3. A vehicle-wheel, comprising a hub, spokes, and rim, the inner ends of the spokes being movable radially in said hub and immovable laterally therein, the outer ends of said spokes being yieldingly connected with said rim and the spokes being capable of flexing whereby the spokes may yield slightly at or near their junction with the rim to a blow given to the periphery of the wheel by an obstruction in the path of movement of the wheel.

4. A vehicle-wheel comprising a hub provided with a plurality of radial cylinders, a rim and spokes, said spokes having at their inner ends piston-like heads fitting within said cylinders, said spokes being resilient between their ends, substantially as described.

5. A vehicle-wheel comprising a hub, spokes and rim, the hub having a plurality of radial cylinders, and the spokes sliding in said cylinders, said spokes being jointed to the rim and resilient between their ends, and certain of said cylinders containing springs bearing against the inner ends of said spokes, substantially as described.

6. A vehicle-wheel comprising a hub, spokes and rim, the hub having a plurality of radial air-tight cylinders, the spokes having piston-headed inner ends, jointed outer ends and being resilient between ends and sliding with a piston fit in said cylinders, certain of said cylinders containing springs bearing against the inner ends of said spokes, substantially as described.

7. A vehicle-wheel composed of a hub, a rim, and a series of spokes united with the rim and slidably connected with the hub, said spokes having each a resilient flattened portion between its ends.

8. A wheel composed of a hub having a series of radial, independent bores open only at their outer ends, said bores being at right angles to the center of rotation of the hub, a rim, a series of spokes yieldingly attached to the rim at their outer ends, and having their inner ends entering the bores of the hub with an air-tight fit, whereby the inner ends of the spokes are maintained out of contact with the bottoms of said bores that the rim may yield to the weight of the load, and said rim due to its friction or to meeting an obstruction in the roadway may temporarily drag somewhat back, thus enabling the spokes to yield at their extremities where joined with the rim.

9. A vehicle comprising a hub, a rim, and a series of one-piece spokes having each a resilient portion between its ends, said spokes being freely movable in fixed radial passages of said hub, the inner ends of the spokes having a piston fit in said radial passages.

10. In a vehicle-wheel comprising a hub provided with a series of cylindrical radial bores at right angles to the axis of rotation of the hub and open only at their outer ends, suitably connected threaded open-centered packing compressing glands applied to the hub about each of said bores and controlling a packing, a rim, a series of spokes made resilient between their ends and connected yieldingly with said rim, the cylindrical piston-ended inner ends being extended through said glands and having a piston fit in said bores, whereby in the use of the wheel the blows to which the wheel is subjected may be taken up by a plurality of air-cushions at the inner ends of said spokes.

In testimony whereof I have signed my name to this specification in the presence of two subscribing witnesses.

GEORGE H. CROSBY.

Witnesses:
HARVEY D. EATON,
COLBY GETCHELL.